March 8, 1966  E. H. LEVY  3,239,734
LIGHT ACTUATED ROTATIONAL TRANSMITTER
Filed July 23, 1963  2 Sheets-Sheet 1
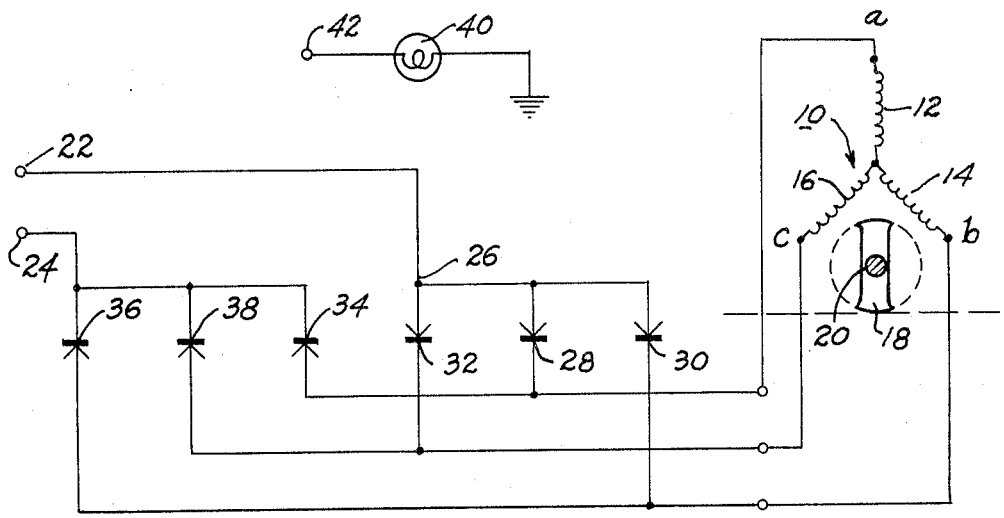
FIG_1
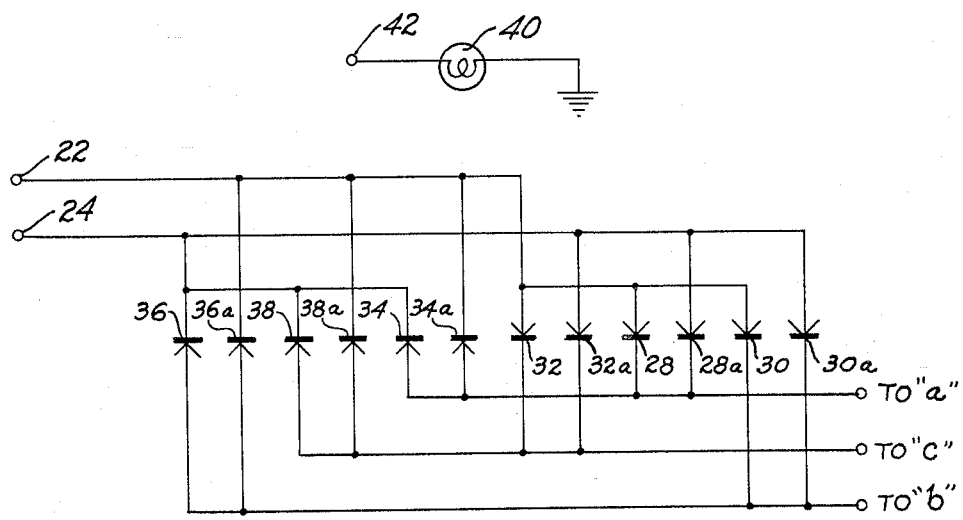
FIG_3
INVENTOR.
ERIC H. LEVY.
BY
*Killman, Smith & Lamb*
ATTORNEYS.

March 8, 1966    E. H. LEVY    3,239,734
LIGHT ACTUATED ROTATIONAL TRANSMITTER
Filed July 23, 1963    2 Sheets-Sheet 2
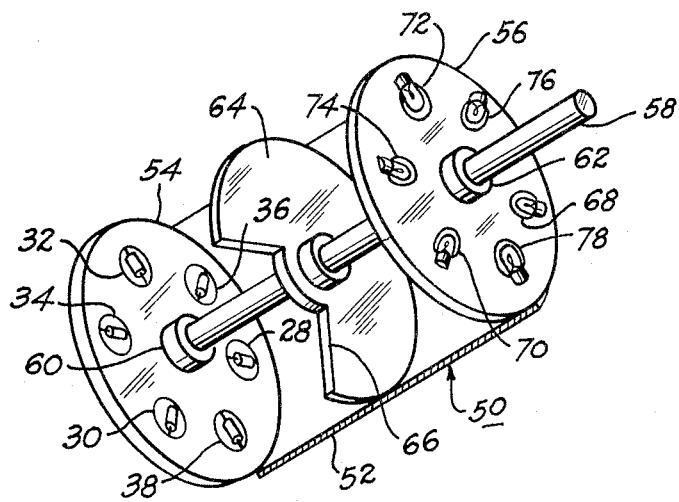
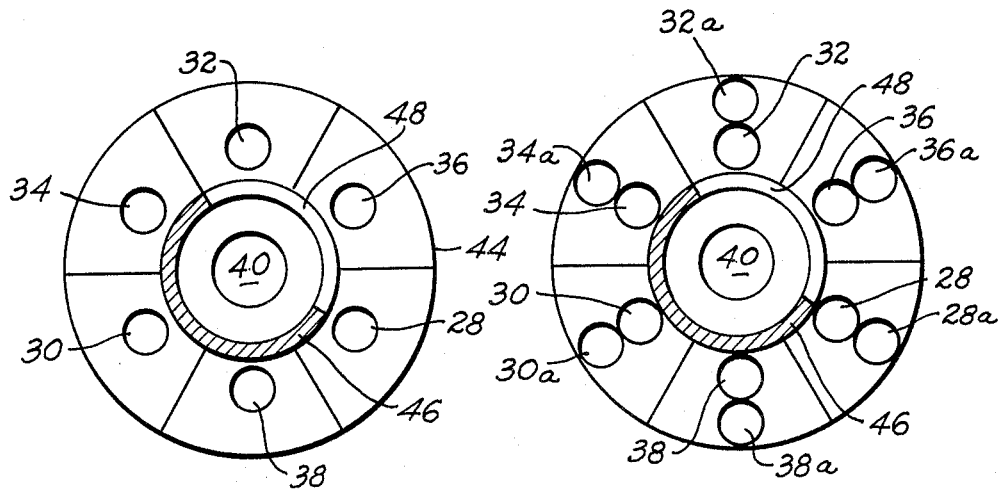
INVENTOR.
ERIC H. LEVY.
BY
Killman, Smith & Lamb
ATTORNEYS

United States Patent Office 3,239,734
Patented Mar. 8, 1966

3,239,734
LIGHT ACTUATED ROTATIONAL TRANSMITTER
Eric H. Levy, Baltimore, Md., assignor to The Bendix
 Corporation, Baltimore, Md., a corporation of
 Delaware
Filed July 23, 1963, Ser. No. 297,090
7 Claims. (Cl. 318—23)

This invention relates to remote indicating devices and, more particularly, to a transmitter for a remote indicatitng device which transmits positional information to a remote receiver in response to an input from a controlled light source.

There are many remote indicating devices presently in use in which a transmitting device sends a signal through wires to a receiver which is positioned at such a distance that a direct mechanical coupling would be impracticable. Synchro receivers and transmitters have been used for this type of instrumentation for many years and are quite successful where they are not too costly and can be made to carry sufficient power to handle the load at the receiver. Another kind of transmitting device which has been used in combination with a receiver having a permanent magnet armature and three "Y" connected field coils similar to a synchro receiver involves the use of a plurality of switches which are actuated by a rotating cam such that by alternately closing two or three of these switches in rotation, a current from a D.C. source is caused to flow through two or three of the coils of the receiver in such manner as to cause the receiver rotor to successively assume a number of discrete positions. This type of transmitter is somewhat less costly than a conventional synchro transmitter for a given power handling capacity and, in some applications, its step response is actually preferable to the infinite resolution afforded by a synchro transmitter. Problems have been experienced, however, in that mechanical wear and arcing at the switch contacts have caused malfunctions. In production, the necessity for precise positioning of the switches or switch actuators relative to the rotatable cam has imposed difficulties in constructing such transmitters. Also, the mechanical force required to actuate the contacts has resulted in loading of the input shaft, which loading, in some cases, is undesirable. It is, therefore, an object of the present invention to provide a transmitter of the type specified in which loading of the input shaft is substantially eliminated.

It is another object of the present invention to provide a transmitter of the type specified in which the wear and arcing associated with mechanical switches is eliminated.

It is a further object of the present invention to provide a transmitting device of the type specified in which the necessity for precise positioning of the switch actuator or switches, is inherently eliminated.

Other objects and advantages will become apparent from the following specification taken in connection with the accompanying drawings in which:

FIG. 1 is a schematic drawing of a circuit arrangement incorporating a light and light sensitive semiconductors connected to the appropriate receiver.

FIG. 2 is a schematic diagram of a transmitter incorporating my invention and showing the physical location of the light sensitive semiconductor devices relative to the light source and the rotating mask.

FIG. 3 is a schematic drawing of a circuit arrangement similar to that of FIG. 1, but modified to provide for full wave rectification of the input voltage.

FIG. 4 is a schematic diagram similar to that of FIG. 2 showing the placement of the additional light sensitive semiconductor devices used in the arrangement of FIG. 3.

FIG. 5 is a perspective view of another modification incorporating my invention.

Referring now to FIG. 1, a remote receiving device 10 is shown as including three Y-connected field coils 12, 14 and 16 having input terminals $a$, $b$ and $c$, respectively. Associated with the windings of receiver 10 is an armature 18 which rotates on a shaft 20 and which assumes an angular position on shaft 20 in accordance with the information supplied on the windings 12, 14 and 16. Armature 20 is typically a permanent magnet but, in some applications, it may be an electromagnet. The receiver 10 is connected to an alternating current source, in this case 26 volts, 400 cycles, at terminals 22 and 24. Terminal 22 is connected to a junction 26 and between junction 26 and terminal $a$ is connected a light responsive semiconductor rectifying device 28. Between junction 26 and terminal $b$ of the receiver 10 is connected a light responsive semiconductor rectifying device 30, and between this junction and receiver terminal $c$ is connected a similar light responsive semiconductor rectifying device 32. Connected to terminal 24 on the opposite side of the alternating current line, are light responsive semiconductor rectifying devices 34, 36 and 38 which are connected to receiver terminals $a$, $b$ and $c$, respectively, but which are oppositely poled with respect to devices 28, 30 and 32. FIG. 1 also shows a conventional lamp 40 connected between a direct current source at terminal 42 and ground.

The characteristics of the semiconductor rectifying devices shown in FIG. 1 are such that they will not conduct in either direction until they are actuated by a small amount of energy from an illuminating source, in this case the lamp 40. Once so actuated, they will continue to conduct with or without light so long as an electrical circuit maintains a current through them in the forward direction. The semiconductor devices will return to their non-conducting stage when the source voltage goes to zero or reverses polarity. In the operation of the devices described herein, then, the semiconductor devices are switched on by means of light actuation and are switched off as a result of polarity reversal of the alternating current source.

This operation will become evident from consideration of an arrangement shown in FIG. 2 wherein the semiconductor devices 28–38 are shown attached to the inside of a cylindrical housing member 44. Located in the interior of housing 44 is the lamp 40 and coaxially positioned with respect to this lamp is a rotatable drum 46 having a 150° light slot which permits the illumination of either two or three of the semiconductor rectifying devices as it rotates. The sequence of operation as the light slot rotates is shown in the table below. Starting with the position shown in FIG. 2 and rotating the slot clockwise:

| Diodes ON | Source Terminal | Diodes | Receiver | Diodes | Source Terminal |
|---|---|---|---|---|---|
| 32, 36 | 22 | 32 | $c \ldots b$ | 36 | 24 |
| 32, 36, 28 | 22 | 32, 28 | $c, a \ldots b$ | 36 | 24 |
| 36, 28 | 22 | 28 | $a \ldots b$ | 36 | 24 |
| 36, 28, 38 | 22 | 28 | $a \ldots b, c$ | 36, 38 | 24 |
| 28, 38 | 22 | 28 | $a \ldots c$ | 38 | 24 |
| 28, 38, 30 | 22 | 28, 30 | $a, b \ldots c$ | 38 | 24 |
| 38, 30 | 22 | 30 | $b \ldots c$ | 38 | 24 |
| 38, 30, 34 | 22 | 30 | $b \ldots a, c$ | 38, 34 | 24 |
| 30, 34 | 22 | 30 | $b \ldots a$ | 34 | 24 |
| 30, 34, 32 | 22 | 30, 32 | $b, c \ldots a$ | 34 | 24 |
| 34, 32 | 22 | 32 | $c \ldots a$ | 34 | 24 |
| 34, 32, 36 | 22 | 32 | $c \ldots a, b$ | 36, 34 | 24 |

With the slot 48 in the position shown, diodes 32 and 36, are illuminated. These are the only diodes which conduct and the path of current flow from the source through the receiver and back is, as shown on the table, from terminal 22 through diode 32, to terminal c and winding 16, to winding 14 and terminal b through diode 36 and to the opposite terminal 24. On the succeeding half-cycle, no current flows because of the polarity of the rectifying devices 32 and 36. Current flow through the windings 16 and 14 as described will result in a given angular position of armature 18. As the drum 46 revolves, succeeding diodes are illuminated and masked and current flow to the receiver is as set forth on the table, giving rise to operation wherein the armature 18 follows the movement of drum 46 in a series of 12 increments or steps per single revolution of the drum 46.

FIG. 3 shows an arrangement somewhat similar to that of FIG. 1, but showing an arrangement in which full-wave rectification is afforded. This arrangement would, of course, provide higher torque at the receiver. Similar numerals have been applied and the operation is, in all respects, analogous to that of FIG. 1, the only significant difference being that diodes 28a–38a have been added to provide a conducting path for the half-cycle which was blocked in the FIG. 1 version. In FIG. 4 it will be seen that the general configuration of the housing, location of the semiconductor rectifying devices, the drum 46 and slot 48 in respect to the lamp 40 are all substantially as shown in FIG. 2. It should be noted, however, that the diodes which are to conduct at the same time are positioned along a radius from the lamp 40 (or perhaps, axially) rather than circumferentially.

Another modification of the rotary transmitter incorporating my invention is shown in FIG. 5. This transmitter shown generally at numeral 50 consists of a cylindrical housing 52 having end plates 54 and 56. Housing 52 is shown broken away in order to show the internal structure in greater detail. The signal input to this device comes by way of rotation of the shaft 58 which is supported in end plates 54 and 56 by means of bearing 60 and 62, respectively. Carried on shaft 58 and rotatable therewith is a circular mask or shutter disk member 64 which has a sector 66 removed. In end plate 54 the diodes 28–38 which are of the light responsive types identical to those shown in FIG. 2 are arranged radially with respect to bearing 60 and substantially equally distributed on the face of end plate 54. End plate 56 has openings containing a plurality of radially arranged lamps 68–78 whose positions and end plate 56 correspond with the positions of semiconductor devices 28–38 in end plate 54. Except for the provision of a plurality of light sources, operation of the modifications shown in FIG. 5 is essentially the same as that in FIG. 2. Rotation of the mask 64 selectively exposes and then shades the diodes 28–38 to provide conduction through the windings of receiver 10 as described above particularly as set out in the table.

While only a limited number of embodiments have been shown and described herein, numerous modifications will occur to those skilled in the art which are within the scope of the present invention.

The invention claimed is:

1. In a system for providing positioning signals to a remote receiving device having a rotatable armature and a plurality of interconnected field coils, said armature being constructed to assume a rotational position as established by the relative magnitudes and polarities of the voltages applied to said field coils;
   a source of alternating current voltage; and
   a transmitter connecting said source with said receiver comprising:
      a source of illumination,
      a plurality of illumination responsive semiconductor rectifying devices connected between said voltage source and said field coils such that at least one of said rectifying devices is connected to conduct current between each side of said alternating current source and one of said field coils, and
      a rotatable mask for selectively exposing and masking said rectifying devices with respect to said source of illumination such that said rectifying devices are caused to conduct current to said field coils in proper sequence to cause said armature to follow the rotation of said mask.

2. A system for providing positioning signals as set forth in claim 1 wherein said semiconductor rectifying devices are positioned on the inner surface of a cylindrical housing, said source of illumination is located at the axis of said housing, and said rotatable mask is driven between said rectifying device and said source of illumination.

3. In a system for providing positioning signals to a remote receiving device having a rotatable permanent magnet armature and a plurality of field coils, said armature being constructed to assume a rotational position as established by the relative magnitude and polarities of the voltages applied to said field coils;
   a source of alternating current voltage; and
   a transmitter connecting said source with said receiver comprising:
      a source of illumination,
      a plurality of illumination responsive semiconductor rectifying devices connected between said voltage source and said field coils such that at least one of said rectifying devices is connected to conduct current between each side of said alternating current source and one of said field coils, and
      a rotatable mask for selectively exposing and masking said rectifying devices with respect to said source of illumination such that said rectifying devices are caused to conduct current to said field coils in proper sequence to cause said armature to follow the rotation of said mask in incremental steps.

4. In a system for providing positioning signals to a rotatable remote receiving device from a transmitter connected to an alternating current voltage source, said receiving device having a permanent magnet armature and a plurality of field coils in the stator and said armature arranged to assume a rotational position as established by the relative magnitude and polarities of the voltages applied to said field coils;
   said transmitter including a source of light,
   a plurality of light sensitive semiconductor rectifying devices arranged to be exposed to said light connected between said voltage source and said field coils such that at least one of said rectifying devices is connected to conduct current between each side of said alternating current source and one of said field coils, and
   a rotatable mask for progressively exposing said rectifying devices to the light from said light source and masking said rectifying devices from said light source such that current is conducted through said field coils to cause said armature to follow the rotation of said mask.

5. In a system for providing positioning signals to a remote receiving device having a rotatable permanent magnet armature and three "Y" connected field coils, said armature being constructed to assume a rotational position as established by the relative magnitudes and polarities of the voltages applied to said field coils;
   a source of alternating current voltage;
   and a transmitter connecting said source with said receiver comprising:
      a source of illumination,
      a plurality of illumination responsive semiconductor rectifying devices connected between said voltage source and said field coils such that at least one of said rectifying devices for each polarity is connected to each of said coils, and
      a rotatable mask for selectively exposing and masking said rectifying devices with respect to said source of illumination such that said rectifying devices are caused to conduct current to said field coils in proper sequence to cause said armature to follow the rotation of said mask.

6. In a system for providing positioning signals to a remote receiving device having a rotatable permanent magnet armature and a plurality of "Y" connected field coils, said armature being constructed to assume a rotational position as established by the relative magnitudes and polarities of the voltages applied to said field coils;
a source of alternating current voltage; and
a transmitter connecting said source with said receiver comprising:
   a source of illumination,
   a plurality of illumination responsive semiconductor rectifying devices connected between said voltage source and said field coils such that, for any given half-cycle of said alternating current voltage, one of said rectifying devices conducts current toward one of said coils and another of said rectifying devices conducts current away from another of said coils, and
   a rotatable mask for selectively exposing and masking said rectifying devices with respect to said source of illumination such that said rectifying devices are caused to conduct current to said field coils in proper sequence to cause said armature to follow the rotation of said mask in incremental steps.

7. A system for providing positioning signals as set forth in claim 6 wherein said semiconductor rectifying devices are positioned on the inner surface of a cylindrical housing, said source of illumination is located at the axis of said housing, and said rotatable mask is driven between said rectifying device and said source of illumination.

References Cited by the Examiner
UNITED STATES PATENTS

| | | | |
|---|---|---|---|
| 1,976,648 | 10/1934 | Wittkuhns | 318—23 |
| 2,225,032 | 12/1940 | Carbonara | 318—25 X |
| 2,402,928 | 6/1946 | Summers | 318—27 |
| 2,919,358 | 12/1959 | Morrison | 318—480 X |
| 3,023,348 | 2/1962 | Cox | 318—480 X |
| 3,096,467 | 7/1963 | Angus et al. | 318—480 X |
| 3,165,679 | 1/1965 | Angus et al. | 318—27 |

JOHN F. COUCH, *Primary Examiner.*